United States Patent [19]

Lee

[11] Patent Number: 4,644,740
[45] Date of Patent: Feb. 24, 1987

[54] REVERSIBLE RAKE

[76] Inventor: Ung L. Lee, 193 Tumblebrook Dr., South Windsow, Conn. 06074

[21] Appl. No.: 705,648

[22] Filed: Feb. 26, 1985

[51] Int. Cl.$^4$ .............................................. A01D 7/10
[52] U.S. Cl. ................................ 56/400.04; 56/400.06
[58] Field of Search ........... 56/400.04, 400.05, 400.06, 56/400.21, 400

[56] References Cited

U.S. PATENT DOCUMENTS

| 385,751 | 7/1888 | Gibbs | 56/400.04 |
| 2,052,885 | 9/1936 | Lee | 56/400.05 |
| 2,597,954 | 5/1952 | Schaller | 172/375 |
| 3,209,527 | 10/1965 | Rick | 56/400.04 |
| 4,157,119 | 6/1979 | Litchfield | 172/375 |

Primary Examiner—Gene Mancene
Assistant Examiner—David I. Tarnoff
Attorney, Agent, or Firm—Birch, Stewart, Kolasch & Birch

[57] ABSTRACT

A reversible rake having an elongated handle member for raking leaves and grass clippings which may be adapted to being pushed along the ground on a bearing member or is reversed and used in a more conventional pulling mode. The rake includes a transverse member having a plurality of raking tines. One side of the tines may be replaced by a snow removal, scraping member.

5 Claims, 8 Drawing Figures

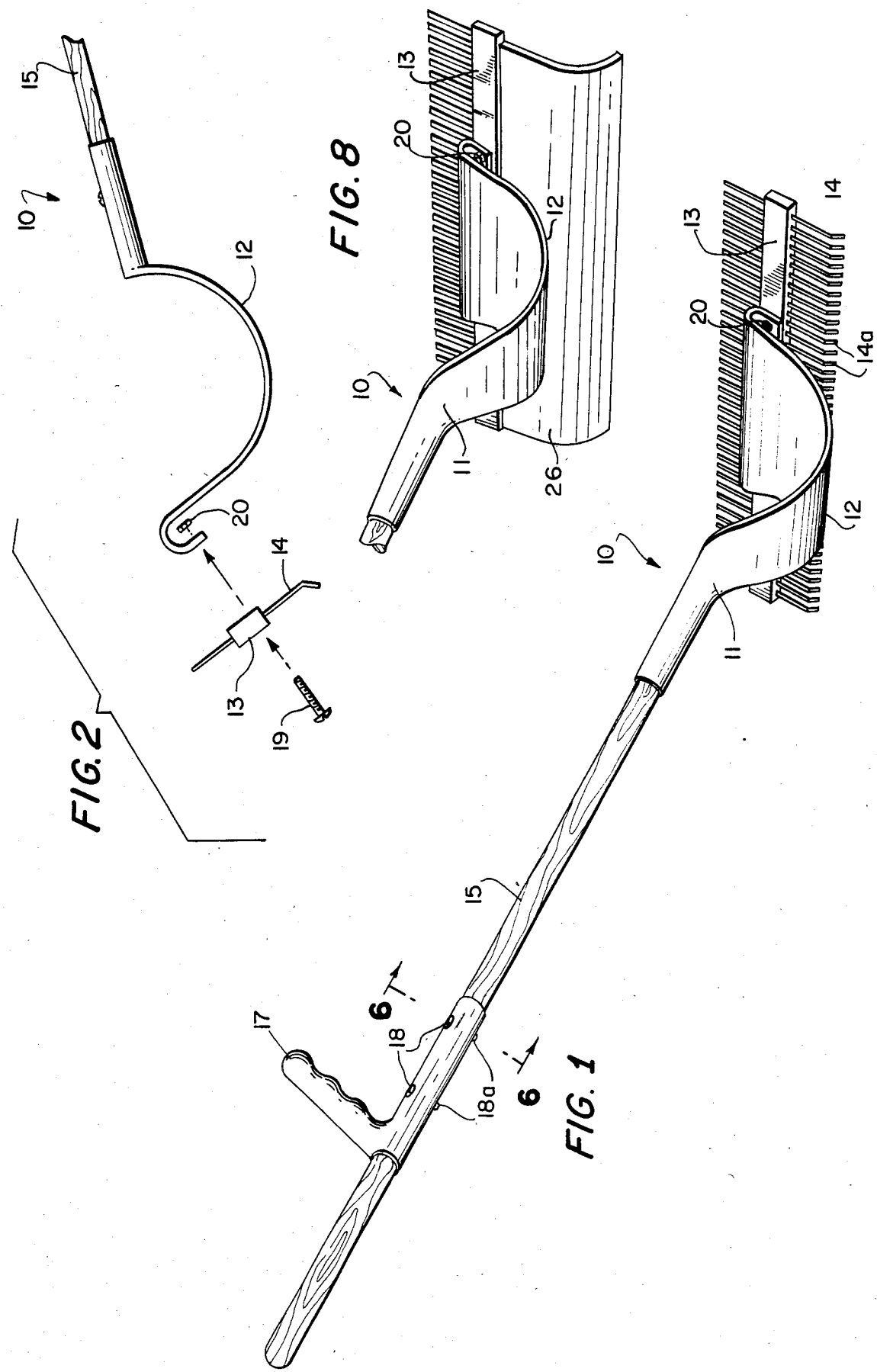

REVERSIBLE RAKE

BACKGROUND OF THE INVENTION

The present invention relates to a reversible rake for raking loose ground covering such as leaves, grass clippings and the like and more specifically to a rake having a pushing or pulling capability.

Manual raking devices have been developed wherein raking tines are supported by wheels. The devices may be rolled along the ground with the raking tines gathering leaves and the like in the path of the device. Such devices do not require an auxiliary power source. However, the raking tines are only moved over tne ground and are not provided with a simulated raking action. Leaves can soon accumulate beneath the raking tines resulting in a dragging raking action which will not rake clearly. Furthermore, the presence of the wheels limits the use of the raking particularly as to the terrain and manipulation of the device.

SUMMARY OF THE INVENTION

Therefore, it is an object of the present invention to provide a rake which may be pushed or pulled uninhibited over the ground.

A further object of the present invention is to provide a rake having a plurality of raking tines projecting from the opposite sides of a transverse shaft for raking leaves or grass clippings.

Another object of the present invention is to provide a raking device which is easily pushed across the terrain in one mode of operation and which can be pulled in a raking motion when used in an alternate mode of operation.

Still a further object of the present invention is to provide a raking device which can double as a snow removal tool.

The foregoing object and others are accomplished in accordance with the present invention generally speaking, by providing a push-and-pull rake device comprising a transverse shaft attached to one end of a handle member, with a plurality of raking tines passed through the transverse shaft. The handle member is provided with a gripping means for pushing the rake or pulling the rake, by reversing the tines, to be manually operated with a raking motion. In its pushing mode of operation the tines having bent ends may be replaced by a solid scraping member suitable for snow removal so as to provide a device having the dual function of removing snow or raking leaves.

Other objects and further scope of the applicability of the present invention will become apparent from the detailed description given hereinafter. It should be understood, however, that the detailed description, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the accompanying drawings which are presented by way of illustration only, and thus are not limitative of the present invention, and wherein:

FIG. 1 is a perspective view of a push-and-pull rake of the present invention;

FIG. 2 is an exploded perspective view of the functional assembly according to the present invention;

FIG. 8 is a perspective view of an alternate embodiment of the present invention wherein the device has a dual function.

DETAILED DESCRIPTION OF THE INVENTION

Figure 5:
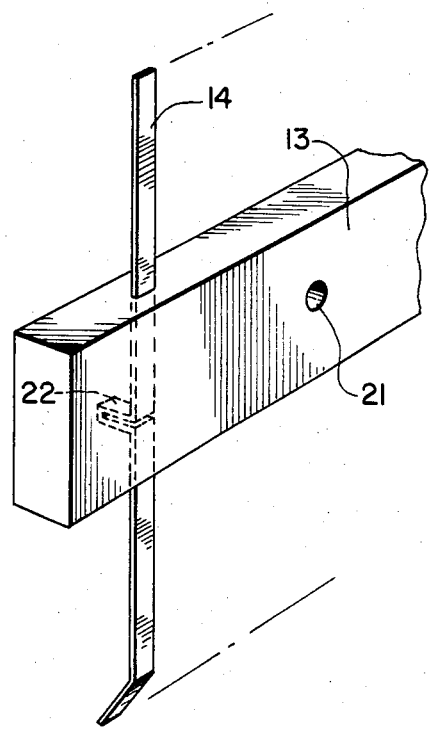
FIG. 5 is a perspective view showing the transverse shaft and related tines of the present invention.

Referring now to FIG. 1 for the purpose of illustrating the present invention there is seen a push-and-pull rake 10, comprising a bearing member 11 having a triangular, arcuate shaped configuration 12, a transverse shaft 13 fixed to the bearing member 11, a plurality of raking tines 14 passed through the transverse shaft 13 and a handle member 15 connected to the bearing member 11. The bearing member 11, is generally made of light steel and the transverse shaft 13 of plastic or aluminum. The transverse shaft 13 having a plurality of raking tines is connected to the bearing member 11 by a bolt 19 and a nut 20 as shown in FIG. 2. The tine 14, made of steel or hard plastic, is passed through the transverse shaft 13 and is bent at a bent portion 22 within the shaft, so that it will not fall out of the shaft, as shown in FIG. 5. The bolt 19 is passed through hole 21.

Figure 6:
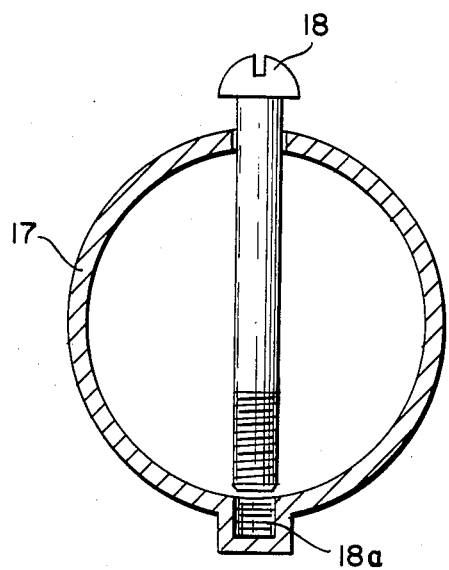
FIG. 6 is a cross-sectional view or a handgrip as seen in FIG. 1.
Figure 7:
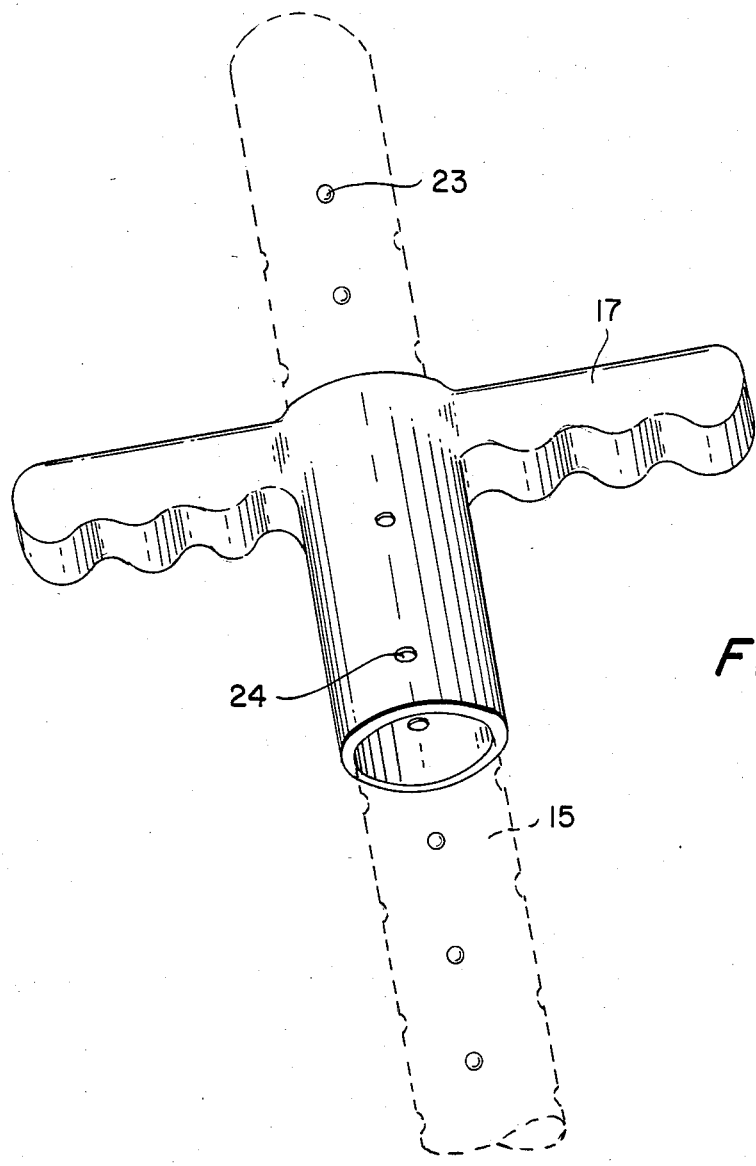
FIG. 7 is a perspective view of an alternate embodiment of the handgrip of the present invention.

The handle member 15 (FIG. 7) has a plurality of holes 23 disposed at its upper end for attaching a gripping means 17 thereto. the gripping means is fastened to the handle member 15 by bolt 18 and nut 18a (FIG. 6). As shown in FIG. 1 or FIG. 7, the present invention can be used to accommodate many different types of handgrips such as "L" or "T" shaped type with holes 24 provided therein for fastening to the handle 15. The handle 15 may be made of any suitable material such as wood, plastic or a light metal, such as aluminum.

Figure 3:
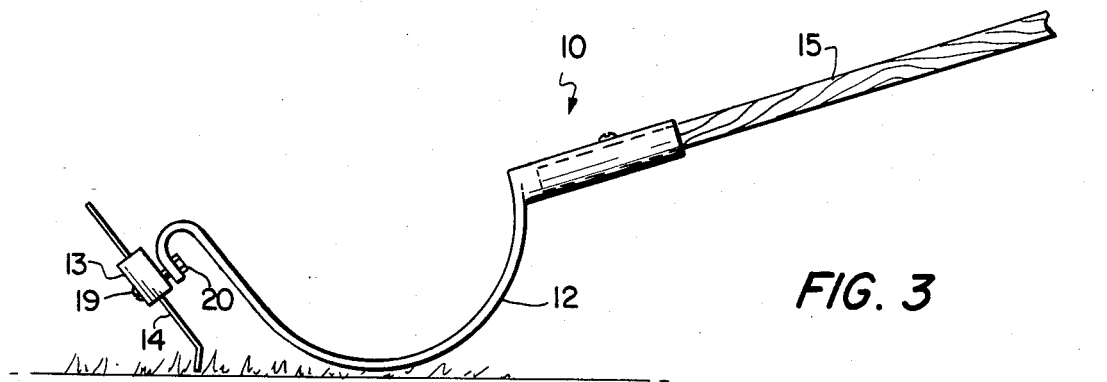
FIG. 3 is a side view showing the rake according to the present invention being used in its pushing mode of operation.
Figure 4:
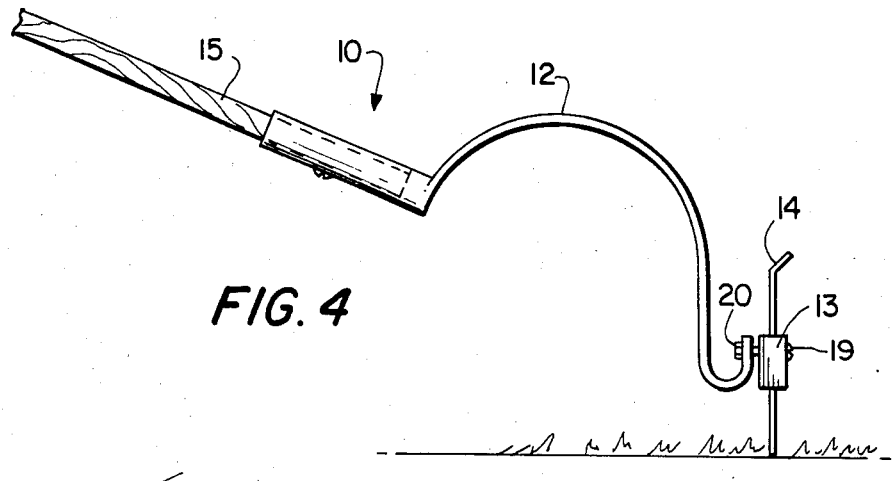
FIG. 4 is a side view showing the rake according to the present invention being used in its pulling mode of operation.

The plurality of raking tines 14 have bent ends 14a so that the leaves can be pushed very easily as the rake glides across the ground on the semicircular, arcuate portion 12. The opposite ends of the bend ends of the tines 14 are straight and the rake can be reversed so that the device can be used in a pulling motion, as in the case with conventional rakes (See FIGS. 3 and 4).

FIG. 8 represents an alternate embodiment of the present invention wherein the rake 10 has the bent tines 14a disposed at one side of the shaft 13 and a scraping member 26 disposed at the other side of the shaft 13 for snow removal purposes. The scraper member 26 is disposed so as to project from the surface of the transverse shaft 13 corresponding to the arcuate portion 12 of the bearing member 11. The raking device including the scraper member 26 accommodates the pushing of the raking device on the convex surface of the arcuate portion 12 of the bearing member 11 for snow removal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reversible dual functioning raking device comprising:
- an elongated handle member having a first and a second end for pushing and pulling said device;
- an arcuate bearing member having first and second ends, said first end of said arcuate bearing member being connected to said first end of said handle member;
- a transverse shaft fixed to said first end of said handle member by way of said arcuate bearing member, said arcuate bearing member having a convex surface, with a concave surface on the opposite side of said arcuate bearing member, said transverse shaft being connected to said second end of said arcuate bearing member;
- a mulitplicity of raking tines which are disposed so as to project from said transverse shaft in the direction of said concave surface of said arcuate bearing member to accommodate the pulling of said device; and
- a scraper member disposed so as to project from said transverse shaft in the direction of said convex surface of said arcuate bearing member to accommodate the pushing of said device on said convex surface along the ground, said raking tines thereby projecting from said transverse shaft in a direction opposite to the direction of projection of said scraper member.

2. The reversible raking device of claim 1, wherein each of said tines has a bent portion whith said transverse shaft.

3. The reversible raking device of claim 1, wherein the elongated handle member has holes disposed at said second end for attaching a gripping member thereto.

4. The reversible raking device of claim 2, wherein the gripping member is "L" shaped type of handgrip.

5. The reversible raking device of claim 2, wherein the gripping member is "T" shaped type of handgrip.

* * * * *